(12) United States Patent
Fukumoto et al.

(10) Patent No.: US 7,489,359 B2
(45) Date of Patent: Feb. 10, 2009

(54) LENS ADAPTER

(75) Inventors: Tetsurou Fukumoto, Kanagawa (JP); Takashi Kubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 10/509,690

(22) PCT Filed: Jan. 28, 2004

(86) PCT No.: PCT/JP2004/000777

§ 371 (c)(1),
(2), (4) Date: Oct. 12, 2004

(87) PCT Pub. No.: WO2004/074925

PCT Pub. Date: Sep. 2, 2004

(65) Prior Publication Data

US 2005/0163494 A1 Jul. 28, 2005

(30) Foreign Application Priority Data

Feb. 20, 2003 (JP) ............................. 2003-043071

(51) Int. Cl.
*G03B 17/00* (2006.01)
*H04N 5/225* (2006.01)
(52) U.S. Cl. ...................... 348/360; 348/375; 348/376; 396/530
(58) Field of Classification Search ................... 348/81, 348/360, 373, 375; 396/530, 25, 26, 27, 396/28, 29; D16/136, 204, 207, 211
See application file for complete search history.

(56) References Cited

U.S. PATENT DOCUMENTS 4,273,434 A * 6/1981 Maitani et al. .............. 396/448
4,666,274 A * 5/1987 Maeno et al. ................ 396/29
4,770,426 A * 9/1988 Kropatsch ................... 277/322
4,847,648 A * 7/1989 Yamaguchi et al. ........... 396/84
5,077,567 A * 12/1991 Haraguchi et al. ............ 396/29

FOREIGN PATENT DOCUMENTS

| JP | 58-79728 | 5/1983 |
| JP | 60-11325 | 1/1985 |
| JP | 2-68535 | 3/1990 |

(Continued)

*Primary Examiner*—Ngoc-Yen T Vu
*Assistant Examiner*—Albert H Cutler
(74) *Attorney, Agent, or Firm*—Oblon, Spivak, McClelland, Maier & Neustadt, P.C.

(57) ABSTRACT

There is provided a lens adapter easily detachable to and from a case, with an optical component such as a filter, a conversion lens etc. attached without a dedicated member on a camera side for attaching. The lens adapter has an attachment section attached to the case of the camera, and a lens barrel housing section provided at the attachment section for housing a lens barrel. The attachment section has first and second members swingably engaging in a detachable manner and is attached to the case in a state that the first and second members sandwich the case in a direction from front to rear of the case. A metallic ring is embedded on a front end of a cylindrical wall section forming a lens barrel housing section. A female screw for attaching an optical component such as a filter, a conversion lens etc. is formed on an inner peripheral surface of the ring.

13 Claims, 15 Drawing Sheets

FOREIGN PATENT DOCUMENTS

| | | |
|---|---|---|
| JP | 2-201340 | 8/1990 |
| JP | 3-67322 | 7/1991 |
| JP | 3-100839 | 10/1991 |
| JP | 9-33999 | 2/1997 |
| JP | 9-101556 | 4/1997 |
| JP | 3093414 | 7/2000 |
| JP | 2000-235222 | 8/2000 |
| JP | 2001-174901 | 6/2001 |
| JP | 2002-6389 | 1/2002 |
| JP | 2002-90869 | 3/2002 |
| JP | 2002-90870 | 3/2002 |
| JP | 2002-90948 | 3/2002 |
| JP | 2002-116491 | 4/2002 |
| JP | 2002-244187 | 8/2002 |
| JP | 2002-250969 | 9/2002 |
| JP | 2002-303930 | 10/2002 |
| JP | 2003-195140 | 7/2003 |
| JP | 2003-195414 | 7/2003 |
| JP | 2003-270711 | 9/2003 |

* cited by examiner

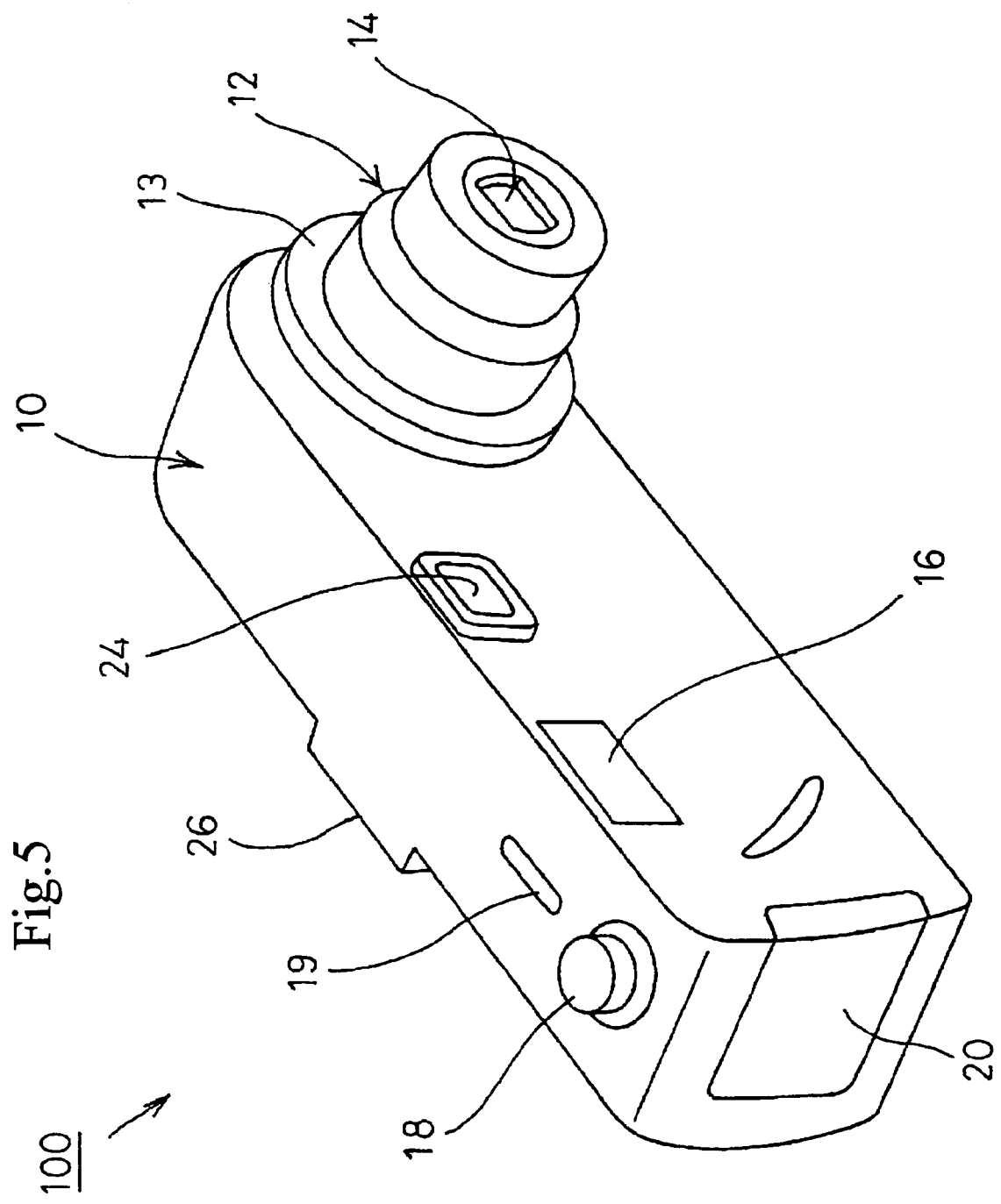

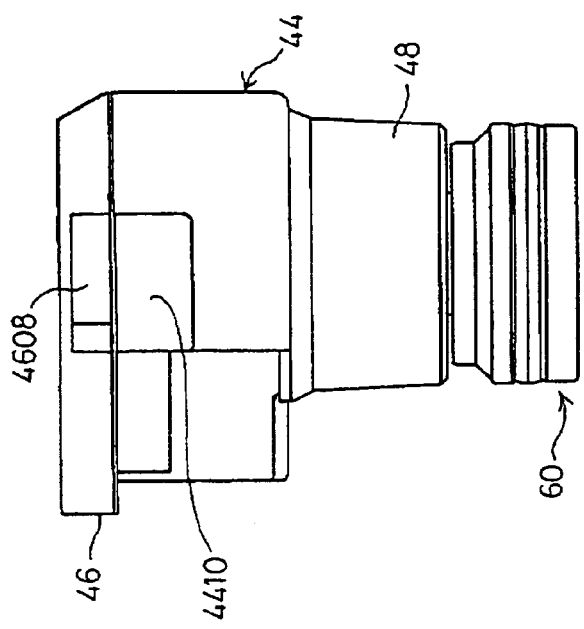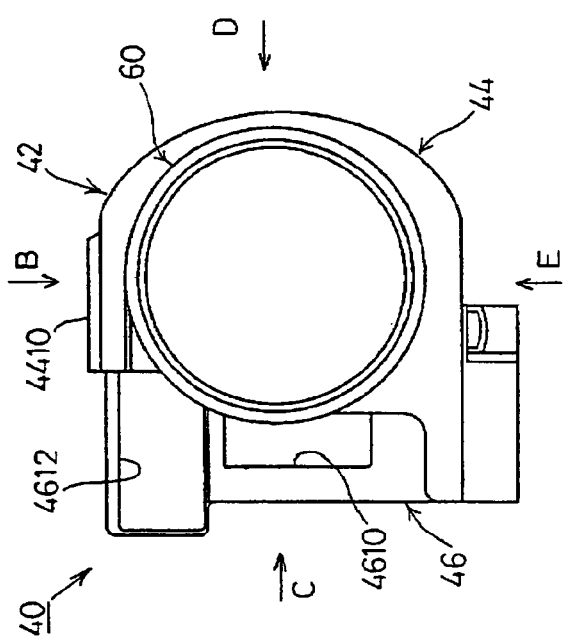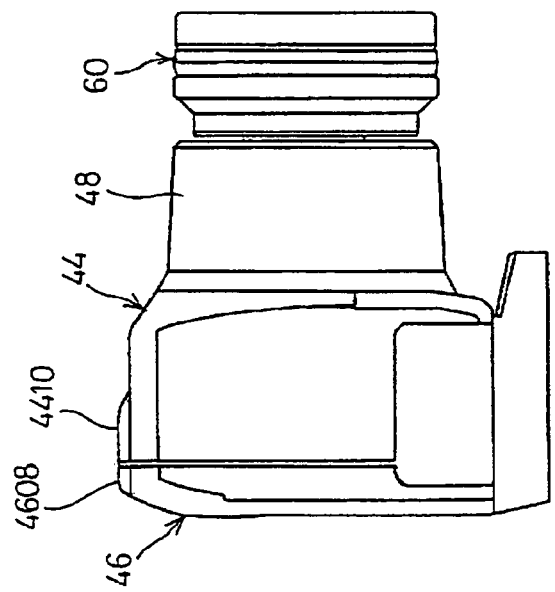

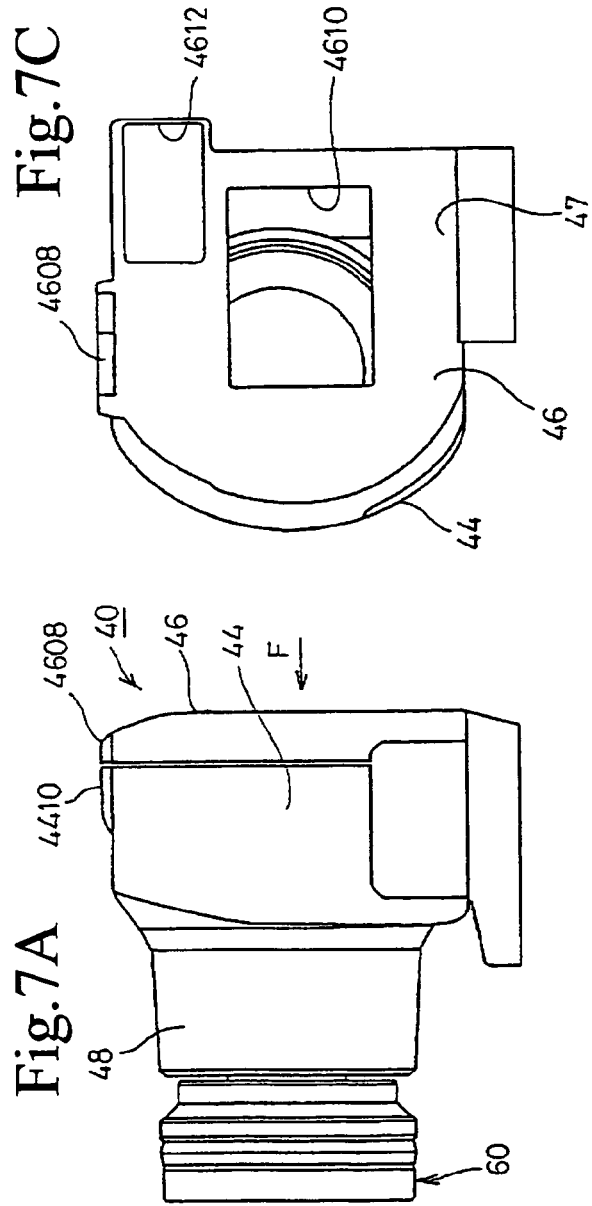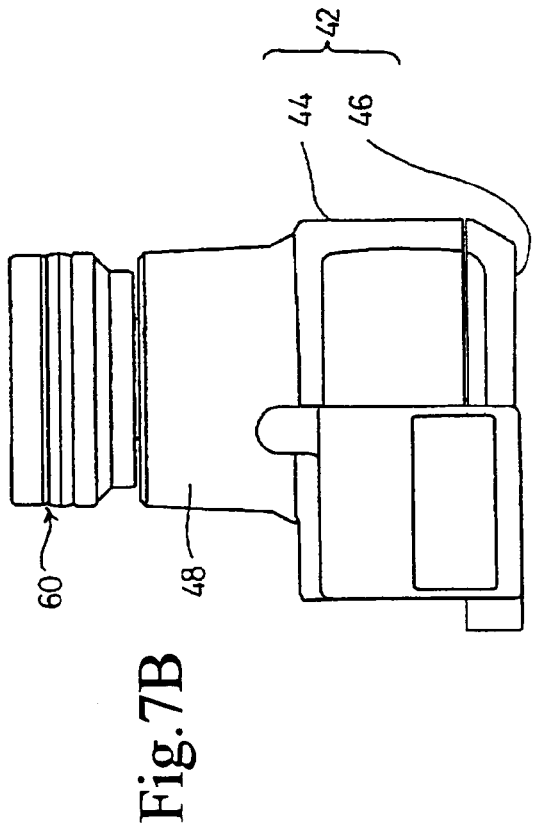

ðŸ‘‰ # LENS ADAPTER

TECHNICAL FIELD

The present invention relates to a lens adapter capable of being mounted on a collapsible lens-type camera.

BACKGROUND ART

Digital still cameras of the related art exist where magnification of a photographing lens can be changed between being wide angle and being telescopic by attaching a conversion lens at a female screw provided at a front end of a lens barrel.

However, with collapsible lens-type cameras where the lens barrel moves between a projection position projecting from the front of the case and a housing position where the lens barrel is housed within the case, when a conversion lens is attached to the lens barrel, the weight of the conversion lens subjects the lens barrel and the drive mechanism driving the lens barrel to inappropriate force, and it is therefore difficult to attach a conversion lens to the lens barrel.

Collapsible lens-type cameras have therefore been proposed where a projection covering the lens barrel at the front surface of the case is provided, with a threaded portion being formed at this projection. One end of a cylindrical adapter is then connected to this threaded portion, and the other end of the adapter is connected to a conversion lens (Japanese patent laid-open publication 2000-235222).

However, with configurations described above where a conversion lens employing an adapter is attached to a camera, it is necessary to provide a dedicated member for attaching such as a projection at the camera case. This increases manufacturing costs for the camera, restricts freedom of design of the case, and the attaching of the adapter and the projector using the threaded portion makes the operation of attaching and detaching the adapter to and from the camera troublesome.

In order to resolve this kind of situation, it is an object of the present invention to provide a lens adapter enabling the attaching of optical components such as filters and conversion lenses etc. without providing dedicated members for use in attaching to the camera and that may be attached to and detached from a case in a straightforward manner.

DISCLOSURE OF THE INVENTION

In order to achieve the object described above, the present invention is characterized by a lens adapter mounting on a collapsible lens-type camera with a lens barrel moving between a projection position of projecting from the front of the case and a housing position of being housed within the case, including an attachment section mounted on the case in a detachable manner, and a lens barrel housing section for housing the lens barrel provided at the attachment section, wherein the lens barrel housing section is including a cylindrical wall section covering the lens barrel and an opening provided at the front end of the cylindrical wall section so as to expose the front end of the lens barrel, with the cylindrical wall section being formed of an internal diameter and length capable of covering the lens barrel positioned at the projection position, and with female screw for attaching optical components such as filters and conversion lenses etc. being formed at the opening.

As a result, it is no longer necessary to provide dedicated members for attaching optical components on the camera side because it is possible to carry out photographing with optical components such as filters and conversion lenses etc. attached to the camera as a result of mounting the lens adapter on the case, increases in camera costs are kept down, a degree of freedom with respect to camera design is ensured, and attachment and detachment of the lens adapter to and from the case is straightforward.

BRIEF DESCRIPTION OF THE DRAWINGS

FIG. 5 is a perspective view of a digital camera attached with a lens adapter;

FIG. 6A is a front view of a lens adapter with a conversion lens attached, FIG. 6B is a view along arrow B of FIG. 6A, and FIG. 6C is a view along arrow C of FIG. 6A;

FIG. 7A is a view along arrow D of FIG. 6A, FIG. 7B is a view along arrow E of FIG. 6A, and FIG. 7C is a view along arrow F of FIG. 7A;

BEST MODE FOR CARRYING OUT THE INVENTION

Next, a description is given with reference to the drawings of preferred embodiments of the present invention.

Figure 1:
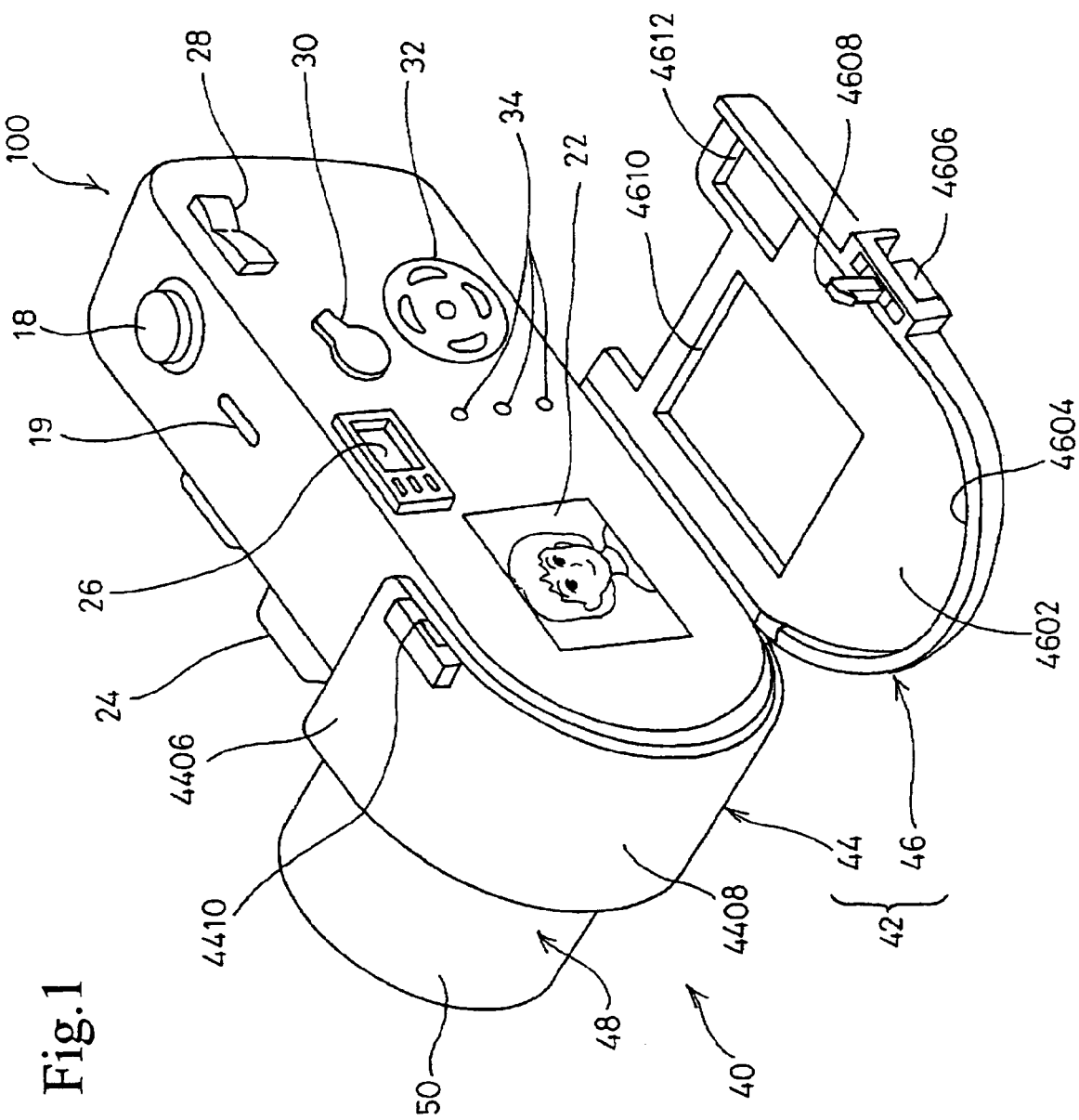
FIG. 1 is a perspective view illustrating attachment of a lens adapter to a digital camera.
Figures 2A, 2B:
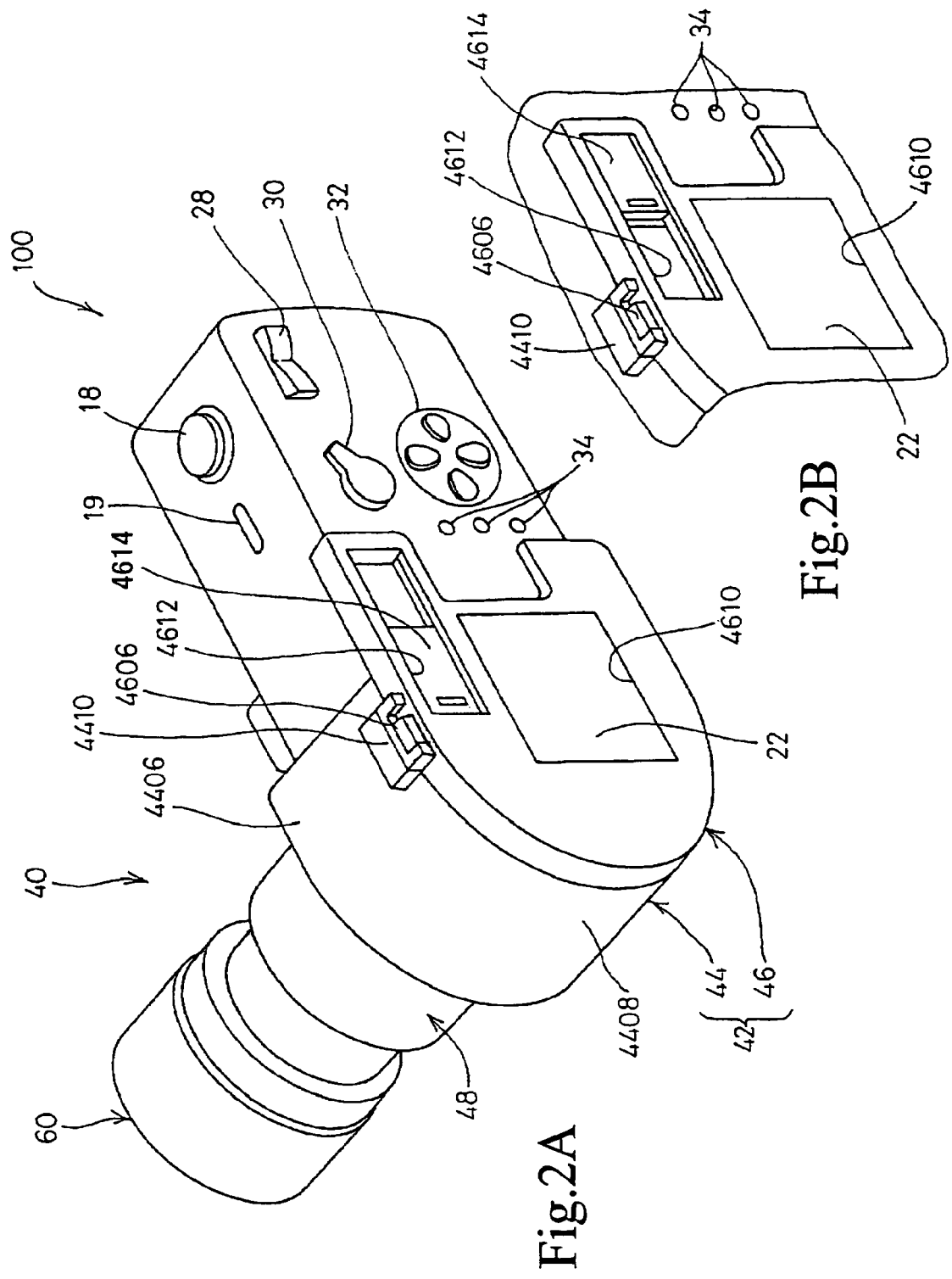
FIG. 2A is a perspective view at an angle from the rear of a digital camera with a lens adapter attached.
FIG. 2B is a perspective view of an opening and closing member in an open state.
Figure 3:
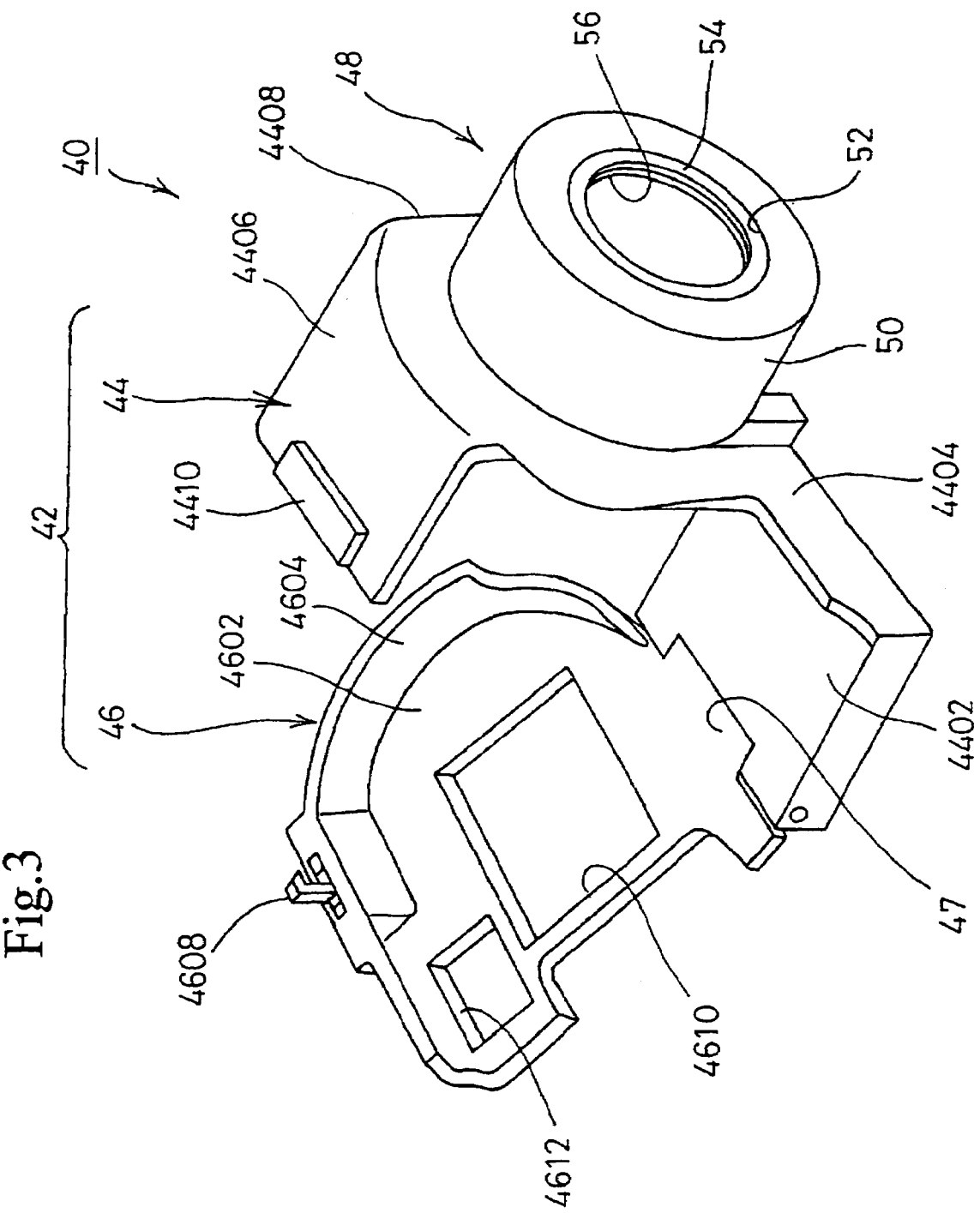
FIG. 3 is a perspective view of a lens adapter viewed at an angle from the front.
Figure 4:
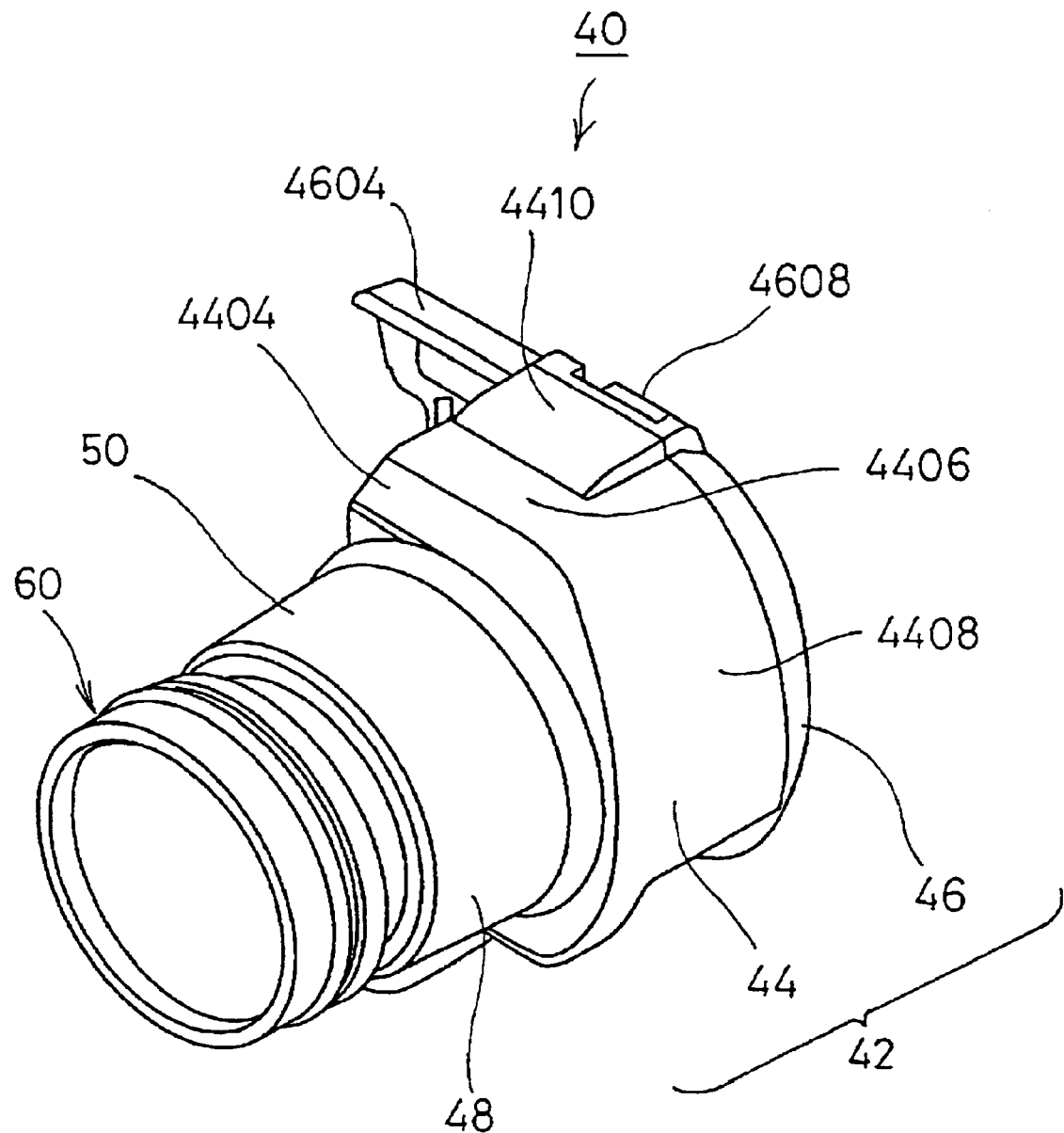
FIG. 4 is a perspective view of a lens adapter with a conversion lens attached as viewed from the front.

FIG. 1 is a perspective view illustrating attachment of a lens adapter to a digital camera, FIG. 2A is a perspective view of a digital camera with a lens adapter attached as viewed from the rear, FIG. 2B is a perspective view of an opening and closing member in an open state, FIG. 3 is a perspective view of a lens adapter viewed at an incline from the front, FIG. 4 is a perspective view of a lens adapter with a conversion lens attached as viewed from the front, and FIG. 5 is a perspective view of a digital camera with a lens adapter attached.

Further, FIG. 6A is a front view of a lens adapter with a conversion lens attached, FIG. 6B is a view along arrow B of. FIG. 6A, and FIG. 6C is a view along arrow C of FIG. 6A. FIG. 7A is a view along arrow D of FIG. 6A, FIG. 7B is a view along arrow E of FIG. 6A, and FIG. 7C is a view along arrow F of FIG. 7A.

First, a digital camera 100 (hereinafter referred to as a "camera") with a lens adapter attached is described with reference to FIG. 1 and FIG. 5.

In the present embodiment, a camera 100 is for recording moving image data or still image data on a memory card taken as a recording medium, and has a case 10.

The case 10 is formed in a laterally elongated overall shape having a height from top to bottom, thickness from front to back, and a length from left to right of a dimension greater than the height and thickness. In this embodiment, the left to the right of the case 10 is taken to be the case 10 as viewed from the rear.

The upper surface, lower surface, front surface, rear surface, and right side surface of the case 10 are formed so as to be substantially flat, and the left side surface is formed as a semi-cylindrical surface, with the left side portion of the front surface and rear surface being formed in the shape of a circular arc.

A lens barrel 12 is provided at a location to the left of the front surface of the case 10, and is constructed so as to be capable of moving between a projection position of projecting to the front of the case 10 as shown in FIG. 5, and a housing position of being housed within the case 10. An annular protruding edge section 13 projecting forwards from the front surface of the case 10 is provided at a location surrounding the outer periphery of the lens barrel 12 at the front surface of the case 10.

A photographing optical system 14 for taking images of subjects is supported so as to be housed on the inside of the lens barrel 12.

Imaging elements etc. (not shown) for detecting images of subjects taken by the optical photographing system 14 and generating imaging signals are provided within the case 10 on the optical axis of the optical photographing system 14. In this embodiment, the optical photographing system 14 is constructed using a zoom system capable of continuously changing the photographing magnification.

A flash 16 for generating supplementary light is provided at a location to the right of the upper portion of the front surface of the case 10, a shutter switch 18 for taking pictures is provided at a location to the left on the upper surface of the case 10, and a power supply switch 19 is provided at a location to the left side of the shutter switch 18.

A finder lens 24 separate from the optical photographing system 14 is provided substantially centrally at an upper portion of the front surface of the case 10.

A housing chamber (not shown) for housing a battery and a memory card is provided at the right side portion of the case 10 and an opening and closing lid 20 for opening and closing the housing chamber is provided at the right side surface.

A display 22 including a liquid crystal device etc. for displaying image data etc. generated based on imaging signals detected by the imaging element is provided at a location to the left on the rear surface of the case 10.

An eyepiece window 26 is provided substantially centrally at an upper portion of the rear surface of the case 10. This eyepiece window 26 is constructed so as to enable subject images taken with the finder lens 24 to be visualized. Namely, a finder apparatus is configured from the finder lens 24 and the eyepiece window 26.

A zoom operation switch 28 for changing the photographing magnification of the optical photographing system 14 between telescopic and wide-angled is provided at a location to the right at an upper portion of the rear surface of the case 10.

A changeover switch 30 for changing over between photographing mode and playback mode etc. is provided at a location between the eyepiece window 26 and the zoom operation switch 28 at the rear surface of the case 10.

An operation switch 32 containing a cross-shape switch and a deciding switch for carrying out various settings is provided at a location below the changeover switch 30 at the rear surface of the case 10.

At the left side of the operation switch 32, a plurality of displays 34 is provided for displaying the operation and mode of the camera 100.

Next, a description is given of the lens adapter attaching to the camera 100 of the above configuration.

As shown in FIG. 1, FIG. 3, and FIG. 6A to FIG. 7C, the lens adapter 40 include an attachment section 42 capable of being attached to and detached from the case 10, and a lens barrel housing section 48 for housing the lens barrel 12 provided at the attachment section 42. The attachment section 42 and the lens barrel housing section 48 are formed together from a synthetic resin having rigidity.

The attachment section 42 includes a first member 44 and a second member 46 swingably engaging with each other in a detachable manner, and is constructed so as to attach to the case 10 so that the case 10 is sandwiched in a direction from the front to the rear of the case 10 by the first member 44 and a second member 46.

The first member 44 includes a lower wall 4402 coming into contact with substantially the left half of the lower surface of the case 10, a front wall 4404 projecting from the front of the lower wall 4402 so as to come into contact with a location to the left of the front surface of the case 10, an upper wall 4406 extending to the rear from the upper portion of the front wall 4404 and coming into contact with a location to the left of the upper surface of the case 10, and a semi-cylindrical left side wall 4408 connected with the left side of the lower wall 4402, front wall 4404, and upper wall 4406 so as to make contact with the left side surface of the case 10.

A recessed engaged section 4410 is provided at the rear end of the upper wall 4406.

The second member 46 is equipped with a rear wall 4602 making contact with substantially the left half of the rear surface of the case 10, with a lower end of the rear wall 4602 being connected to the rear end of the lower wall 4402 of the first member 44 via a hinge 47, with the first member 44 and the second member 46 therefore being connected in such a manner as to be capable of swinging.

The left side of the rear wall 4602 is formed in an arc-shape corresponding to the arc-shape of the left side of the rear surface of the case 10.

Further, a projecting wall 4604 is formed from the left edge along the upper edge of the rear wall 4602 so as to come into contact with a location to the left on the upper surface of the case 10 and the left side surface of the case 10.

An operation member 4606 capable of sliding in a direction from left to right is provided at a location on the projecting wall 4604 positioned at the upper edge of the rear wall 4602. An engaging section 4608 including an engaging pawl engaging with and detaching from the engaged section 4410 is provided integrally at the operation member 4606. The operation member 4606 and the engaging section 4608 are forced in a direction where the engaging section 4608 engages with the engaged section 4410. As shown in FIG. 1, FIG. 2A and FIG. 2B, the first and second members 44 and 46 are connected as a result of the engaging section 4608 engaging with the engaged section 4410 in a state where the case 10 is sandwiched by the first member 44 and the second member 46. As a result, the attachment section 42 is attached at the case 10.

As shown in FIG. 2A and FIG. 2B, a display opening 4610 exposing the display 22 is provided at a location of the rear wall 4602 facing the display 22 with the attachment section 42 attached at the case 10.

Further, an eyepiece window opening 4612 exposing the eyepiece window 26 is provided at a location of the rear wall 4602 facing the eyepiece window 26 in a state where the attachment section 42 is attached at the case 10.

An opening and closing member 4614 capable of sliding in a direction from left to right is provided at the eyepiece window opening 4612. As shown in FIG. 2A, the eyepiece window opening 4612 is then closed over as a result of sliding the opening and closing member 4614 to the left side, and as shown in FIG. 2B, the eyepiece window opening 4612 is opened up as a result of sliding the opening and closing member 4614 to the right side.

In the state where the attachment section 42 is attached at the case 10, the shutter switch 18, power supply switch 19, zoom operation switch 28, changeover switch 30, and operation switch 32 are positioned on the outer side of the attachment section 42 so as to be exposed to the outside.

The lens barrel housing section 48 includes material that blocks out light in order to prevent unnecessary light from entering into the optical photographing system 14 while the lens adapter 40 is attached on the camera 100.

As shown in FIG. 3, the lens barrel housing section 48 is provided at the front wall 4404 of the first member 44.

The lens barrel housing section 48 is comprised of a cylindrical wall section 50 covering the lens barrel 12, and an opening 52 provided at the front end of the cylindrical wall section 50 so as to expose the optical photographing system 14 at the front end of the lens barrel 12.

The cylindrical wall section 50 is formed with an internal diameter and length capable of covering the lens barrel 12 positioned at the projection position.

A metallic ring 54 is embedded and fixed at the front end of the cylindrical wall section 50, and a female screw 56 for attaching optical components such as filters and conversion lenses 60 etc. is formed at the inner peripheral surface of the ring 54. In this embodiment, an opening 52 exposing the optical photographing system 14 at the front end of the lens barrel 12 is formed on the inside of the inner peripheral surface of the ring 54.

Next, a description is given of the operation of a lens adapter 40 constructed in the above manner.

While the lens adapter 40 is attached to the case 10, as shown in FIG. 3, the front wall 4404 of the first member 44 faces the front surface of the case 10 with the first member 44 and the second member 46 in an open state, the lens barrel 12 is inserted to within the cylindrical wall section 50, the upper surface, left side surface, and lower surface of the case 10 are made contact with and pushed in the lower wall 4402 of the first member 44, left side wall 4408, and upper wall 4406 respectively make contact with and push against and the front surface of the case 10 is made contact with the front wall 4404 of the first member 44. As a result, as shown in FIG. 1, the first member 44 is attached to the case 10.

Next, the second member 46 is swung in a direction towards the first member 44, the rear wall 4602 comes into contact with the rear surface of the case 10, the projecting portion 4604 comes into contact with a location to the left on the upper surface of the case 10 and the left side surface of the case 10 respectively, and the engaging section 4608 engages with the engaged section 4410.

As a result, the first member 44 and a second member 46 engage, and the attachment section 42 is attached to the case 10 so that the case 10 is sandwiched by the first member 44 and the second member 46.

Movement of the lens adapter 40 in the vertical direction is restricted as a result of the upper wall 4406 and lower wall 4402 of the attachment section 42 making contact with the upper surface and lower surface of the case 10 respectively, and also the base of the cylindrical wall section 50 of the lens barrel housing section 48 coming into contact with the protruding edge section 13 of the case 10. Further, movement of the lens adapter 40 in a direction from front to back is restricted by the front wall 4404 and the rear wall 4602 of the attachment section 42 coming into contact with the front surface and rear surface of the case 10 respectively. Further, movement of the lens adapter 40 in a direction from left to right is restricted as a result of the left side wall 4408 of the attachment section 42 coming into contact with the left side surface of the case 10, and also the base of the cylindrical wall section 50 of the lens barrel housing section 48 coming into contact with the protruding edge section 13 of the case 10. As a result, the lens adapter 40 attaches stably to the case 10 without rattling.

As shown in FIG. 4, in the case of photographing using a conversion lens 60, a male screw at the base of the conversion lens 60 screws into the female screw 56 of the lens barrel housing section 48 of the lens adapter 40, and the conversion lens 60 is attached to the lens adapter 40 as shown in FIG. 2A and FIG. 2B, and FIG. 4.

As a result, the conversion lens 60 becomes positioned to the front of the optical photographing system 14 of the camera 100, and photographing at a photographing magnification that is a combination of photographing magnification of the optical photographing system 14 and the conversion lens 60 is achieved.

On the other hand, the conversion lens 60 has a function for changing the photographing magnification of the optical photographing system 14 between wide-angled side and telescopic side. The photographing magnification and image angle for the image of the subject as viewed using the finder apparatus with the conversion lens 60 attached to the lens adapter 40 and the image of the subject as actually taken by the imaging element via the conversion lens 60 and the optical photographing system 14 are different.

It is therefore necessary to view the subject image using the display 22 rather than using the finder apparatus while using the conversion lens 60.

As a result, when the conversion lens 60 is attached at the lens adapter 40, as shown in FIG. 2A, if the eyepiece window opening 4612 is covered over by the opening and closing member 4614, it is possible to prevent photographing using the finder apparatus.

When photographing is carried out using a filter, a male thread of the filter screws into the female screw 56 of the lens barrel housing section 48 of the lens adapter 40 attached at the case 10 so that the filter is attached at the lens adapter 40.

As a result, the filter is positioned to the front of the optical photographing system 14 of the camera 100 and photographing is possible using the filter.

Further, when the lens adapter 40 is removed from the case 10, engaging of the engaging section 4608 and the engaged section 4410 is released by operating the operation member 4606 of the lens adapter 40, the second member 46 is swung in a direction away from the first member 44, and the attachment section 42 is pulled out towards the front of the case 10. As a result, the lens adapter 40 can be removed from the case 10.

As described above, according to the present embodiment, it is possible to attach optical components such as filters and conversion lenses 60 etc. to the camera 100 and then carry out photographing by mounting the attachment section 42 of the lens adapter 40 on the case 10.

As a result, it is possible to attach filters and conversion lenses without providing dedicated members for attaching optical components on the camera-side, increases in camera costs can be suppressed, and it is possible to ensure a degree of freedom with respect to design of the camera.

Moreover, it is possible to mount a lens adapter 40 on the case 10 by connecting the first and second members 44 and 46 in a state where the first member 44 and second member 46 sandwich the case 10 in a direction from front to back of the case 10. It is therefore straightforward to mount the lens adapter 40 on the case 10.

Further, the lens barrel 12 is positioned on the inside of the cylindrical wall section 50 of the lens barrel housing section 48 with the lens adapter 40 mounted on the case 10. It is therefore possible to reliably prevent external force from being applied to the lens barrel 12 in a projection position, and the lens barrel 12 and drive mechanism driving the lens barrel 12 are protected.

Moreover, it is possible to hold a portion of the cylindrical wall section 50 of the lens barrel housing section 48 by hand with the lens adapter 40 mounted on the case 10 which is advantageous in preventing hand-shake during photographing.

Further, an opening and closing member 4614 for opening and closing the eyepiece window opening 4612 is provided. Erroneous use of the finder apparatus when photographing using the conversion lens 60 is therefore prevented, which is advantageous in preventing mistakes being made during photographing.

In this embodiment, the opening and closing member 4614 is provided for opening and closing the eyepiece window opening 4612 but the same results can also be obtained by providing the attachment section 42 with an opening and closing member for opening and closing the finder lens 24 at a location facing the finder lens 24.

Next, a description is given with reference to the drawings of a second embodiment of the present invention.

Figure 8:
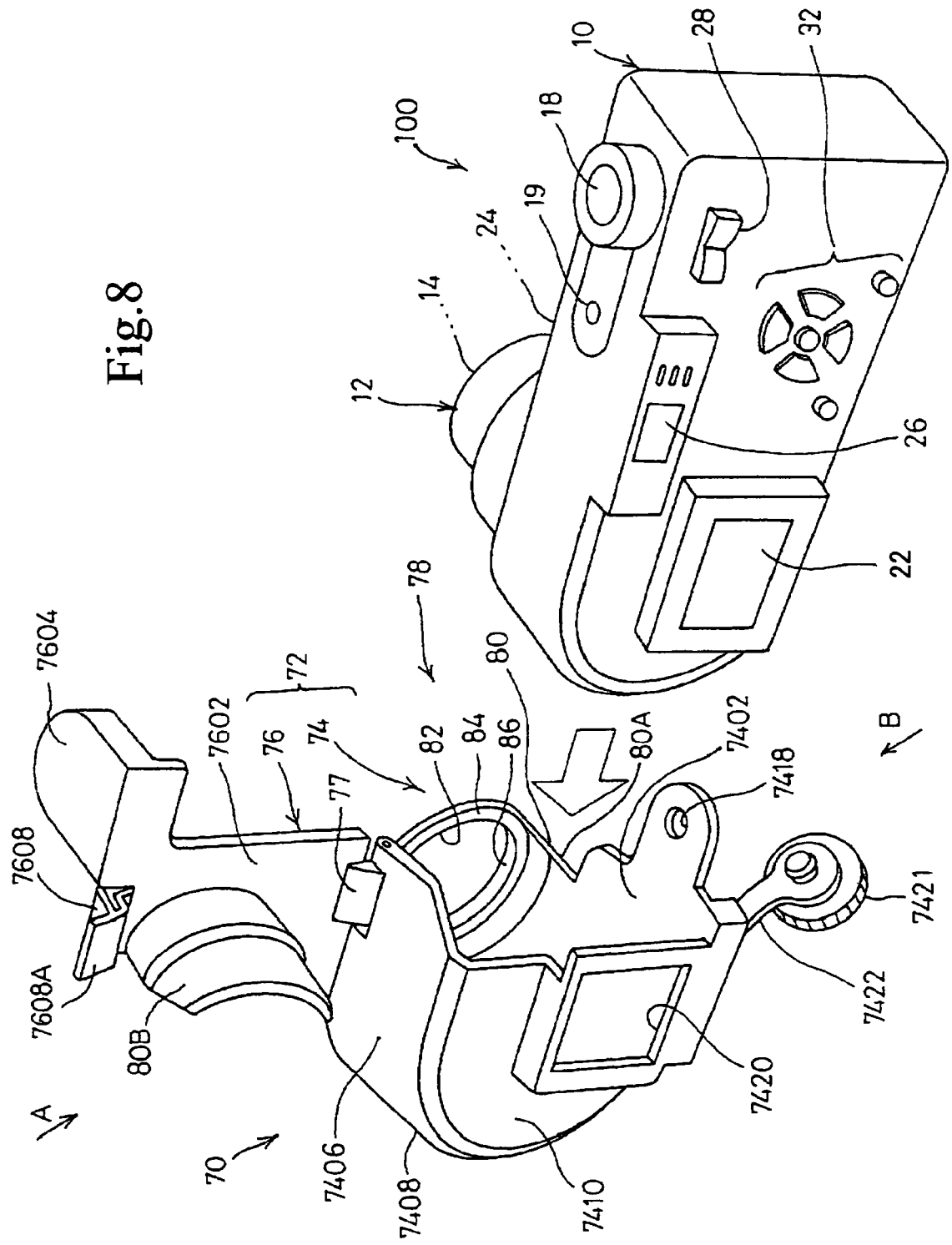
FIG. 8 is a perspective view of a digital camera attached with a lens adapter.
Figure 9:
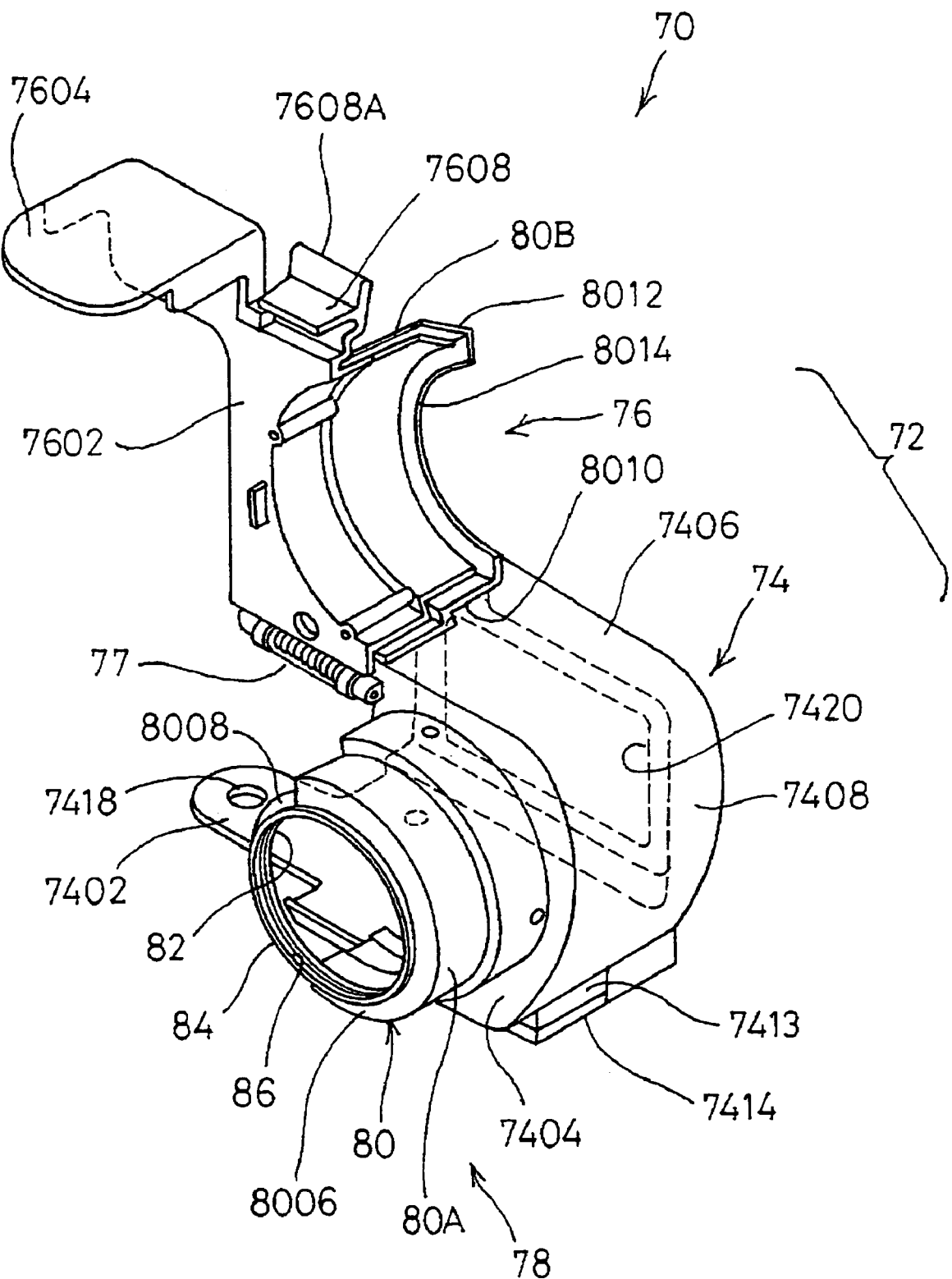
FIG. 9 is a view along arrow A of FIG. 8.
Figure 10:
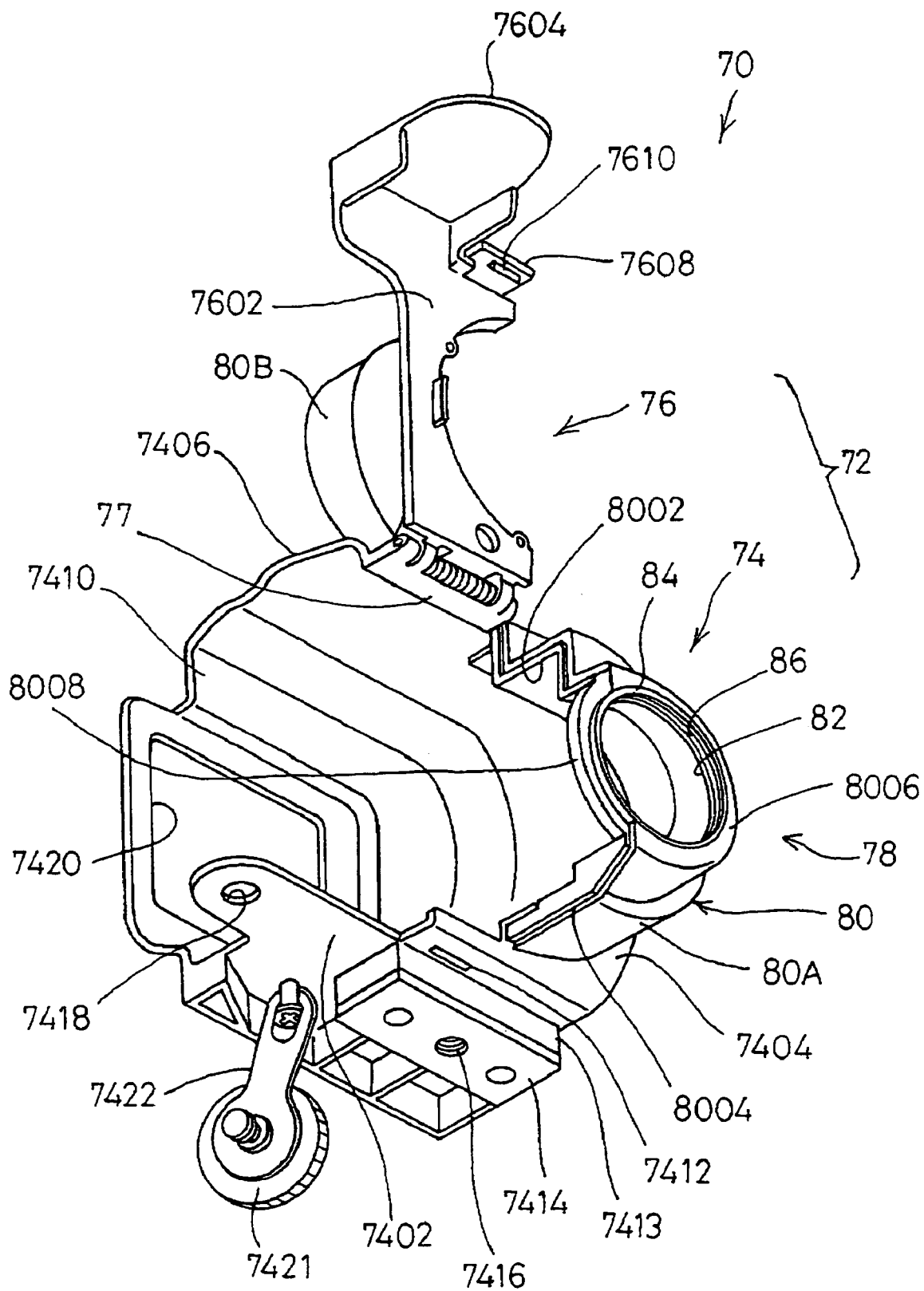
FIG. 10 is a view along arrow B of FIG. 8.

FIG. 8 is a perspective view illustrating attachment of a lens adapter to a digital camera, FIG. 9 is a view along arrow A of FIG. 8, and FIG. 10 is a view along arrow B of FIG. 8.

Figure 11B:
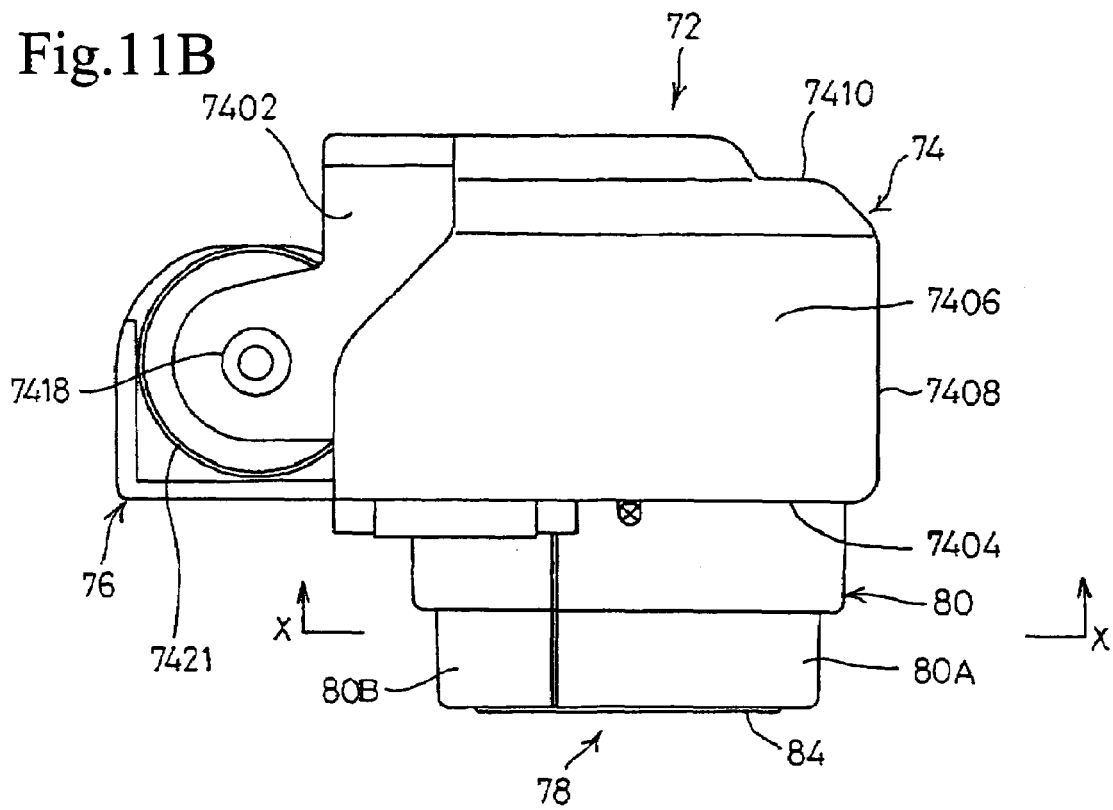
FIG. 11B is a view along arrow B of FIG. 11A.
Figure 11A:
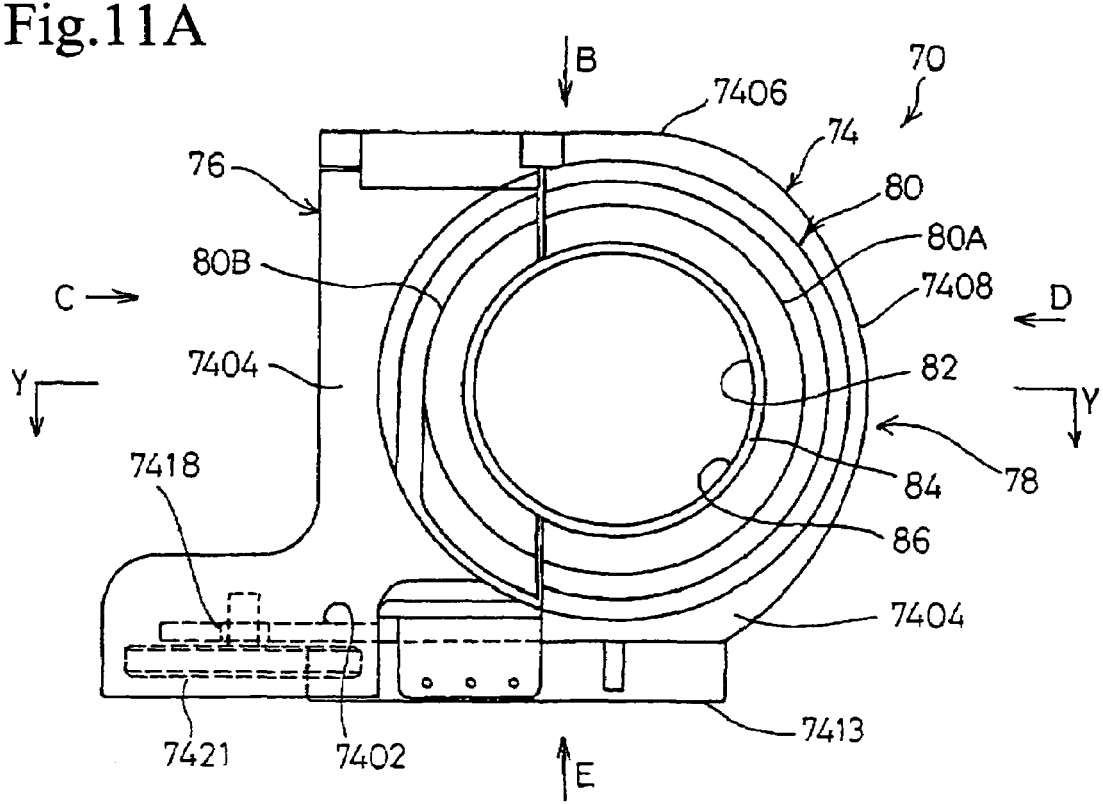
FIG. 11A is a front view of a lens adapter.
Figure 12A:
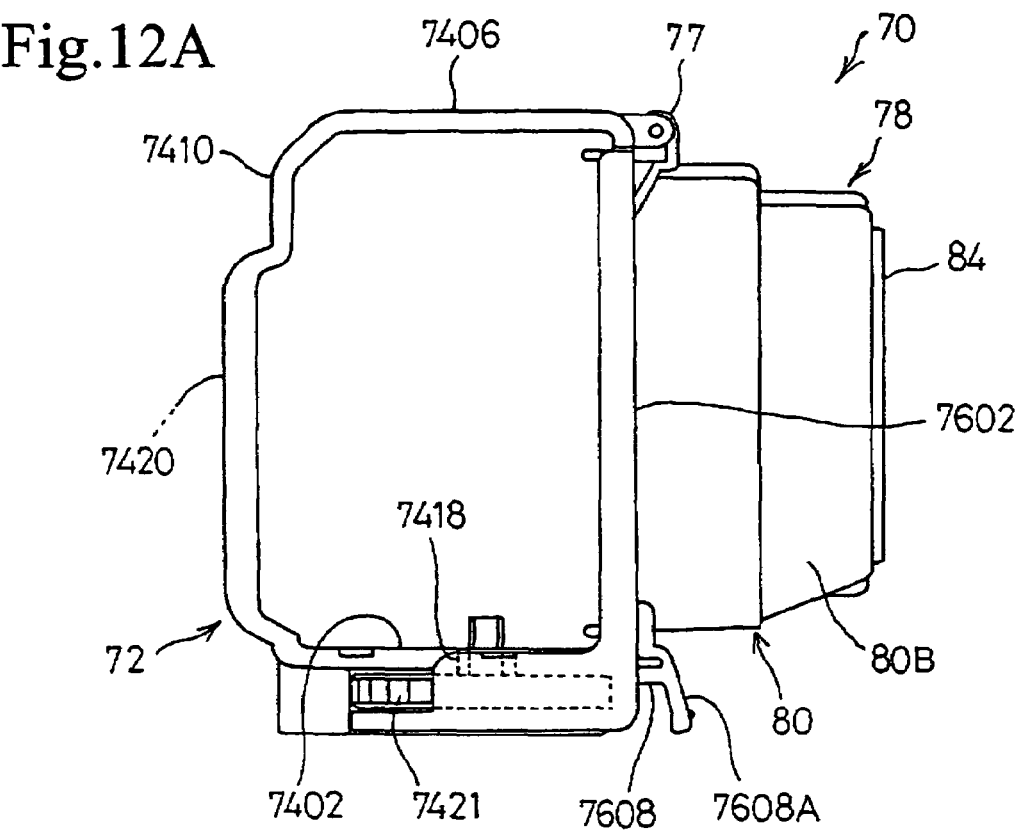
FIG. 12A is a view along arrow C of FIG. 11A
Figure 12B:
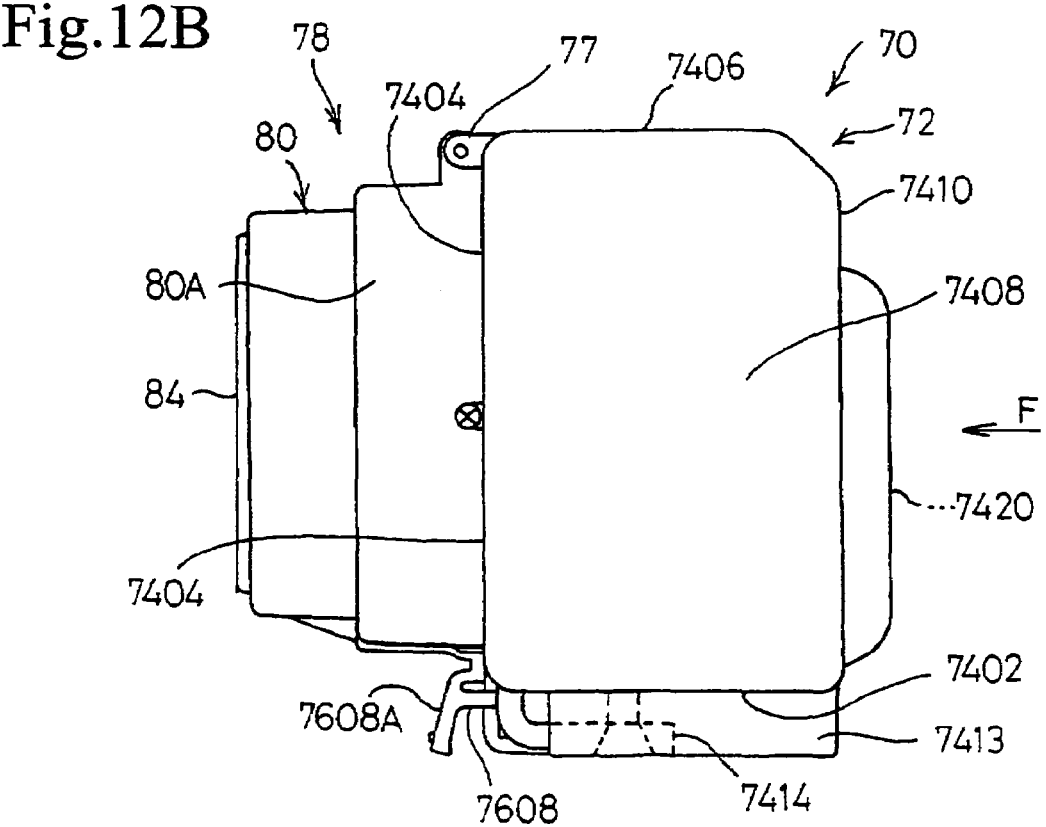
FIG. 12B is a view along arrow D of FIG. 11A.
Figure 13A:
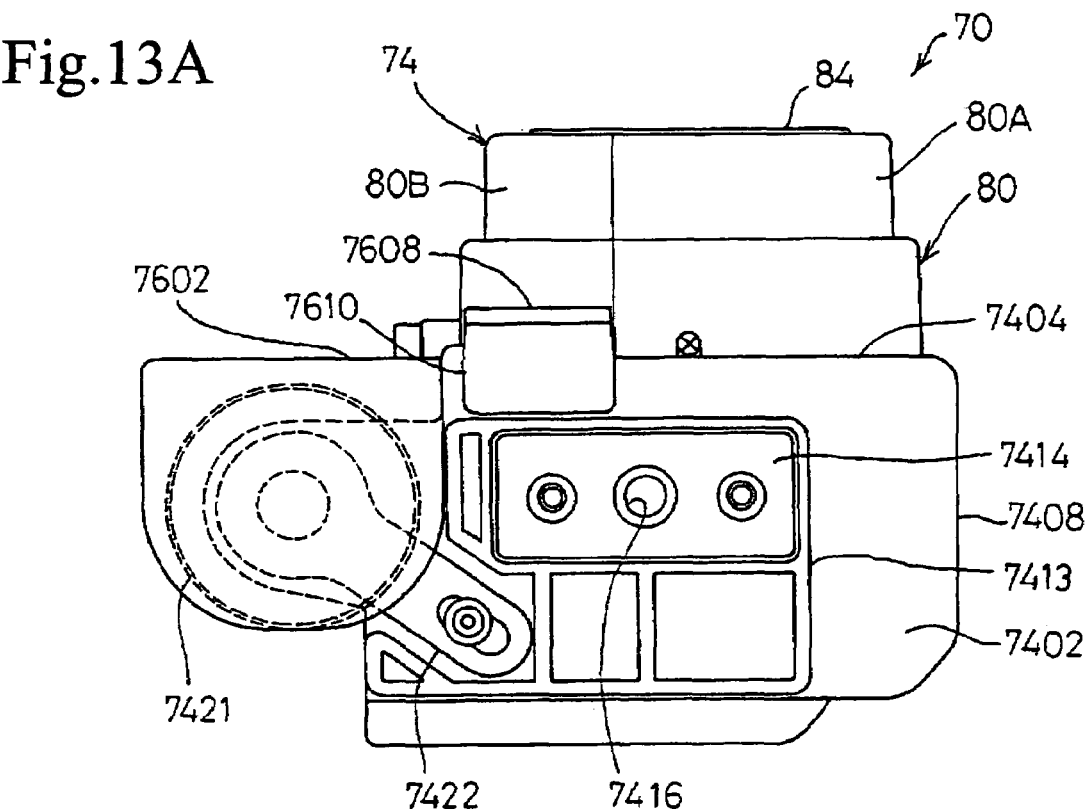
FIG. 13A is a view along arrow E of FIG. 11A.
Figure 13B:
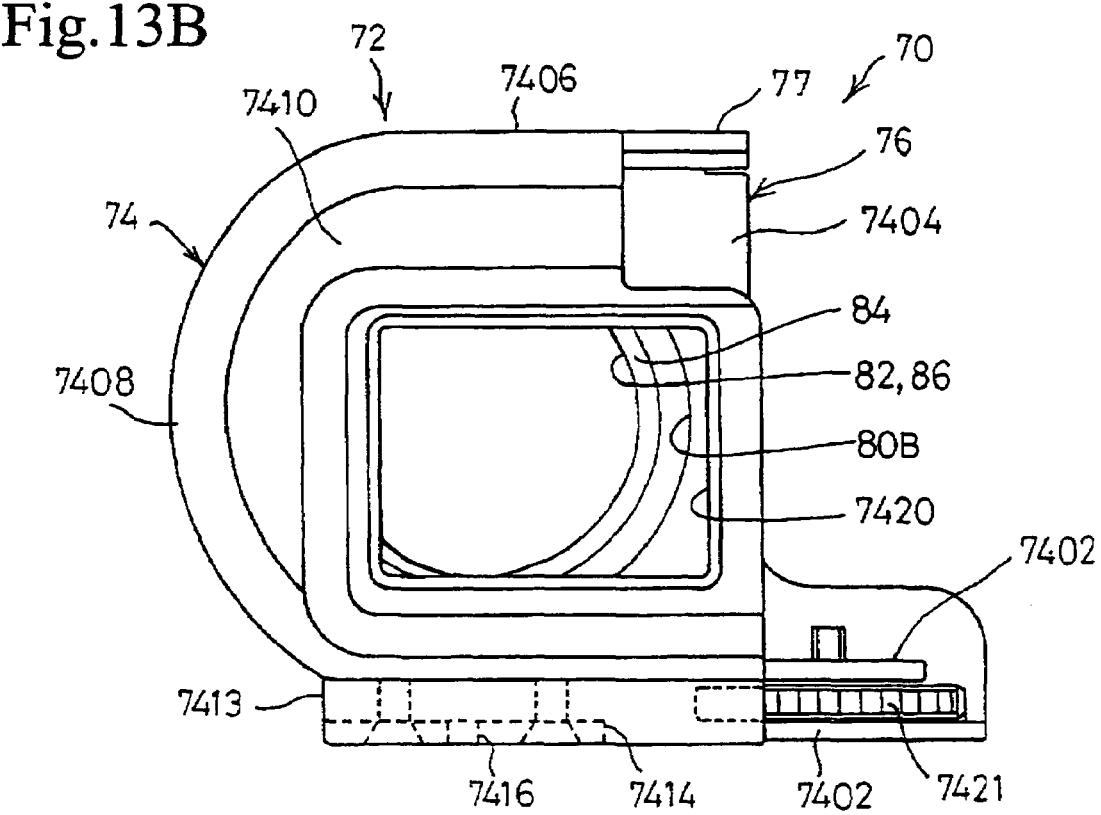
FIG. 13B is a view along arrow F of FIG. 12B.
Figure 14:
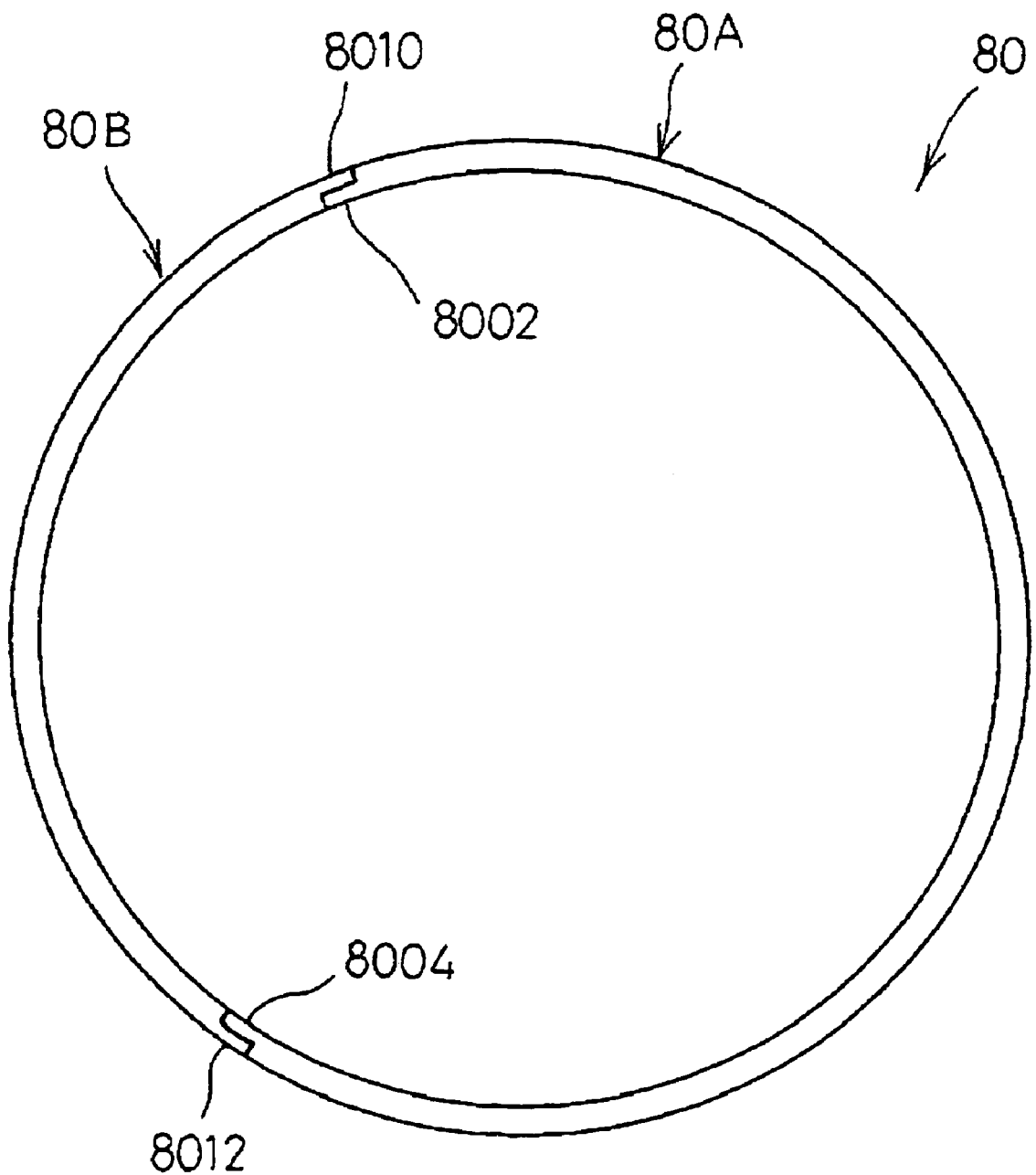
FIG. 14 is a cross-sectional view along line XX of FIG. 11B.
Figure 15:
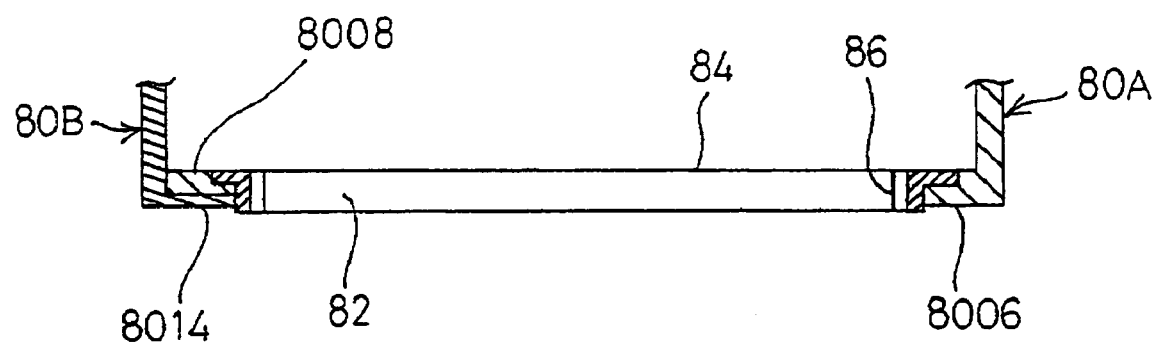
FIG. 15 is a cross-sectional view along line YY of FIG. 11A.

Further, FIG. 11A is a front view of a lens adapter, and FIG. 11B is a view along arrow B of FIG. 11A. FIG. 12A is a view along arrow C of FIG. 11A and FIG. 12B is a view along arrow D of FIG. 11A. FIG. 13A is a view along arrow E of FIG. 11A, and FIG. 13B is a view along arrow F of FIG. 12B. FIG. 14 is a cross-sectional view along line XX of FIG. 11B, and FIG. 15 is a cross-sectional view along line YY of FIG. 11A.

In the second embodiment, members and portions that are the same as for the first embodiment are described with the same numerals.

First, a description is given of a lens adapter.

As shown in FIG. 8 to FIG. 13B, a lens adapter 70 includes an attachment section 72 capable of being attached in a detachable manner to the case 10, and a lens barrel housing section 78 for housing the lens barrel 12 provided at the attachment section 72. The attachment section 72 and the lens barrel housing section 78 are formed together from a synthetic resin having rigidity.

The attachment section 72 has a first member 74 and a second member 76 swingably engating with each other in a detachable manner. The lens barrel housing section 78 also includes a cylindrical wall section 80 covering the lens barrel 12 and an opening 82 provided at the front end of the cylindrical wall section 80 and exposing the front end of the lens barrel 12.

The first member 74 includes a lower wall 7402 coming into contact with a location near the lens barrel 12 of the left half of the lower surface of the case 10, a front wall 7404 projecting from the front of the lower wall 7402 so as to come into contact with a location to the left side near the lens barrel 12 of the left half of the front surface of the case 10, an upper wall 7406 extending to the rear from the upper portion of the front wall 7404 coming into contact with a location by the lens barrel 12 of the left half of the upper surface of the case 10, a semi-cylindrical left side wall 7408 connecting the left sides of the lower wall 7402, front wall 7404 and upper wall 7406 and making contact with the left side surface of the case 10, and a rear wall 7410 connecting the rear sides of the lower wall 7402, front wall 7404, upper wall 7406 and left side wall 7408 so as to make contact with a location at substantially the left half of the rear surface of the case 10.

The left side portion of the front wall 7404 is formed in the shape of a circular arc corresponding to the circular arc shape of the left side portion of the front surface of the case 10, and the left side portion of the rear wall 7410 is formed in the shape of a circular arc corresponding to the circular arc shape of the left side portion of the rear surface of the case 10.

An engaging groove 7412 as shown in FIG. 10 is provided at a location to the front of the lower surface of the lower wall 7402.

Further, a attaching seat 7413 is formed so as to protrude at a location to the rear of the engaging groove 7412 at a location to the front of the lower surface of the lower wall 7402, a rectangular plate-shaped metal plate 7414 is attached using screws to the attaching seat 7413, and female screw for tripod attachment 7416 is provided at the metal plate 7414. In other words, the female screw for tripod attachment 7416 is provided located at the lower wall 7402 facing the bottom surface of the case 10.

A female screw for tripod attachment (not shown) is provided at the lower wall of the case 10. A screw insertion hole 7418 is also provided at the lower wall 7402 facing the female screw for tripod attachment of the case 10 when the lower wall 7402 is lined up with the lower wall of the case 10. An attachment screw 7421 is supported by a support piece 7422 for preventing dropping out and provided at the lower wall 7402 in the vicinity of the screw insertion hole 7418.

Further, a display opening 7420 for exposing the display 22 with the front wall 7404, rear wall 7410, upper wall 7406 and lower wall 7402 of the first member 74 making contact with the front surface, rear surface, upper surface and lower surface of the case 10 is provided at a location on the rear wall 7410 facing the display 22. The location of the rear wall 7410 facing the eyepiece window 26 is formed in a shape exposing the eyepiece window 26.

Moreover, a first cylindrical wall 80A projects from the front wall 7404, and an annular wall 8006 is provided at the front end of the first cylindrical wall 80A.

The first cylindrical wall 80A is formed as portion of the cylindrical wall section 80, and the first cylindrical wall 80A and the annular wall 8006 are formed of a material that blocks out light.

Specifically, the first cylindrical wall 80A is formed with an internal diameter and length capable of covering the lens barrel 12 positioned at the projecting position, is formed as a half-cylinder capable of covering from the portion of the left half of the outer peripheral surface of the lens barrel 12 to portion of the right half, and the right side portion of the first cylindrical wall 80A is open.

As shown in FIG. 10, a thin-walled section 8002 of small thickness is formed at the left edge of the upper portion of the first cylindrical wall 80A, and a thin-walled section 8004 having similar thickness to the thin-walled section 8002 is formed at the left edge of the lower portion of the first cylindrical wall 80A.

A metallic ring 84 is embedded and fixed at the inner periphery of the annular wall 8006, and a female screw 86 for attaching optical components such as a filter and the conversion lense 60 etc. is formed at the inner peripheral surface of the ring 84. In this embodiment, an opening 82 exposing the optical photographing system 14 at the front end of the lens barrel 12 is formed on the inside of the inner peripheral surface of the ring 84.

The circular arc portion by the right half of the annular wall 8006 is formed by a thin-walled section 8008 of small thickness.

The second member 76 has a front wall 7602 making contact with a location other than a location contacted by the front wall 7404 of the first member 74 at a location on the right side from the lens barrel 12 of the left half portion of the front surface of the case, and a second cylindrical wall 80B projecting from the front wall 7602.

The second member 76 is such that the upper end of the front wall 7602 is connected to a front end of the upper wall 7406 of the first member 74 via a hinge 77 so that the first member 74 and second member 76 are connected so as to be able to swing.

The front wall 7404, rear wall 7410, upper wall 7406 and lower wall 7402 of the first member 74 make contact with the front surface, rear surface, upper surface and lower surface of the case 10, an L-shaped operation piece 7608 is provided at the lower end of the front wall 7602 so as to face the engaging groove 7412 with the second member 76 being made to swing so that the front wall 7602 of the second member 76 comes into contact with the front surface of the case 10, and an engaging pawl 7610 engaging with the engaging groove 7412 is provided at the operation piece 7608. The first and second members 74 and 76 are linked as a result of the engaging pawl 7610 engaging with the engaging groove 7412 so that the attachment section 72 is attached to the case 10. Further, when a finger press 7608A of the operation piece 7608 is pressed from this state, the engaging pawl 7610 comes out from the engaging groove 7412.

Moreover, an upright piece 7604 facing the screw insertion hole 7418 of the lower wall 7402 of the first member 74 is provided extending to the rear at the lower end of the front wall 7602 with the attachment section 72 attached to the case 10 as described above.

In the state where the attachment section 72 is attached at the case 10, as described above, the shutter switch 18, power supply switch 19, zoom operation switch 28, changeover switch 30, and operation switch 32 are positioned on the outer side of the attachment section 72 so as to be exposed to the outside.

The second cylindrical wall 80B forms the remaining portion of the cylindrical wall section 80. A thin-walled section 8014 extending in a circular arc is formed at the front end of the second cylindrical wall 80B, and the second cylindrical wall 80B and the thin-walled section 8014 are formed of a material that blocks out light.

Specifically, the second cylindrical wall 80B is formed with an internal diameter and length capable of covering the lens barrel 12 positioned at the projection position, is formed as a half-cylinder capable of covering a portion of the right half of the outer peripheral surface of the lens barrel 12, and the left side portion of the second cylindrical wall 80B is open.

As shown in FIG. 9, a thin-walled section 8010 of a small thickness is formed at the left edge of the upper portion of the second cylindrical wall 80B, and a thin-walled section 8012 having similar thickness to the thin-walled section 8010 is formed at the left edge of the lower portion of the second cylindrical wall 80B.

Next, a description is given of the operation of a lens adapter 70 constructed in the above manner.

While the lens adapter 70 is attached to the case 10, as shown in FIG. 8, the first member 74 and the second member 76 are taken to be open, the left side wall 7408 of the first member 74 is made to face the left side surface of the case 10, the lens barrel 12 is made to face the inside of a portion of the first cylindrical wall 80A, the lower wall 7402, front wall 7404, upper wall 7406 and rear wall 7410 of the first member 74 respectively make contact so as to push against the lower surface, front surface, upper surface and rear surface of the case 10, and the left side surface of the case 10 makes contact with the left side wall 7408 of the first member 74.

The attachment screw 7421 is then screwed into the female screw for tripod attachment of the case 10 via the screw insertion hole 7418, and as a result, the first member 74 is fixed to the case 10.

Next, the second member 76 is swung in a direction towards the first member 74, and the front wall 7602 comes into contact with the front surface of the case 10. During this time, as a result of the upright piece 7604 facing the lower wall 7402, as shown in FIG. 13A and FIG. 13B, the head portion of the attachment screw 7421 is covered by the upright piece 7604, and aesthetic appearance can be improved due to the head portion of the screw 7421 being concealed.

The engaging pawl 7610 then engages with the engaging groove 7412 so as to cause the first member 74 and the second member 76 to become connected, thus resulting in the attachment section 72 being attached to the case 10.

The upper wall 7406 and lower wall 7402 of the attachment section 72 make contact with the upper surface and lower surface of the case 10 respectively, and movement of the lens adapter 70 in the vertical direction is restricted as a result of the base of the cylindrical wall section 80 of the lens barrel housing section 78 coming into contact with the protruding edge section 13 of the case 10. Further, movement of the lens adapter 70 in a direction from front to back is restricted by the front walls 7404 and 7602 and the rear wall 7410 of the attachment section 72 coming into contact with the front surface and rear surface of the case 10 respectively. Further, movement of the lens adapter 70 in a direction from left to right is restricted as a result of the left side wall 7408 of the attachment section 72 comes into contact with the left side surface of the case 10 and also the base of the cylindrical wall section 80 of the lens barrel housing section 78 coming into contact with the protruding edge section 13 of the case 10. As a result, the lens adapter 70 attaches stably to the case 10 without rattling.

Further, the cylindrical wall section 80 is formed from the first cylindrical wall 80A and the second cylindrical wall 80B. During this time, as shown in FIG. 14 and FIG. 15, the thin-walled section 8002 of the first cylindrical wall 80A overlaps with the thin-walled section 8010 of the second cylindrical wall 80B, the thin-walled section 8004 of the first cylindrical wall 80A overlaps with the thin-walled section 8012 of the second cylindrical wall 80B, and the thin-walled section 8008 of the first cylindrical wall 80A overlaps with the thin-walled section 8014 of the second cylindrical wall 80B so as to ensure that the joined surfaces of the first cylindrical wall 80A and the second cylindrical wall 80B reliably cut-out light.

Further, by providing the thin-walled section 8002, 8004, 8010 and 8012, the inner periphery and outer periphery of the cylindrical wall section 80 have inner peripheral surfaces and outer peripheral surfaces of uniform diameters without affecting the overlapping of the thin-walled sections 8002 and 8010 or the thin-walled sections 8004 and 8012, and by providing the thin-walled sections 8008 and 8014, the annular wall at the front end of the cylindrical wall section 80 also becomes a uniform annular surface without any steps, which is beneficial for the aesthetic appearance.

In the case of photographing using the conversion lens 60, as with the first embodiment, the male screw at the base of the conversion lens 60 screws into the female screw 86 of the lens barrel housing section 78 of the lens adapter 70, and the conversion lens 60 is attached to the lens adapter 40.

As a result, the conversion lens 60 becomes positioned to the front of the optical photographing system 14 of the camera 100, and photographing at a photographing magnification that is a combination of that of the optical photographing system 14 and the conversion lens 60 is achieved.

When photographing is carried out using a filter, a male screw of the filter screws into the female screw 86 of the lens barrel housing section 78 of the lens adapter 70 attached at the case 10 so that the filter is attached at the lens adapter 70.

As a result, the filter is positioned to the front of the optical photographing system 14 of the camera 100 and photographing is possible using the filter.

Further, when the lens adapter is removed from the case 10, engaging of the engaging pawl 7610 and the engaging groove 7412 is released by operating the operation piece 7608 of the lens adapter 70, the second member 76 is swung in a direction away from the first member 74, and the attachment section 72 is pulled out towards the left of the case 10. The lens adapter 70 can then be removed from the case 10.

As described above, according to this embodiment, it is no longer necessary to provide dedicated components at the camera 100 for optical component attaching use for attaching optical components such as a filter and the conversion lens 60 etc., increases in camera costs can be kept down, and a degree of freedom of camera design can be ensured.

Further, the lens adapter 70 can be attached to the case 10 by attaching the attachment section 72 to the case 10 by engaging the first member 74 and the second member 76. The lens adapter 70 can therefore be attached to and detached from the case 10 in a straightforward manner.

Moreover, it is possible to reliably prevent external force from being applied to the lens barrel 12 when in a projection position using the lens adapter 70 and the lens barrel 12 and drive mechanism driving the lens barrel 12 are protected.

Moreover, it is possible to hold a portion of the cylindrical wall section 50 of the lens barrel housing section 78 by hand, which is advantageous in preventing hand-shake during photographing.

Further, the female screw for tripod attachment 7416 is provided at the lens adapter 70. It is therefore possible to take pictures using a tripod, even without using the female screw for tripod attachment of the case 10, by attaching the lens adapter 70 to the case 10.

The attachment screw 7421 is screwed into the female screw for tripod attachment of the case 10 so as to fix the attachment section 72 to the case 10. The lens adapter 70 is therefore reliably fixed to the case 10, and the camera 100 is reliably supported by the tripod.

In the second embodiment, as with the first embodiment, an eyepiece window opening is provided for the attachment section 72 at such a location as to face the eyepiece window 26. By then providing an opening and closing member enabling the eyepiece window opening to be opened and closed, it is possible in this case also to prevent erroneous photographing from taking place while photographing using the conversion lens 60. Further, it is also possible to obtain the same results by providing the attachment section 72 of the lens adapter 70 with an opening and closing member for opening and closing the finder lens 24 at a location facing the finder lens 24.

In the first embodiment, and similarly in the second embodiment, a configuration where a screw insertion hole is provided in the attachment section 42 and an attachment screw is then screwed into female screw for tripod attachment of the case 10 via this screw insertion hole, with the attachment section 42 being fixed to the case 10 as a result, is arbitrary.

In this embodiment, a description is given where the camera mounted with the lens adapter is a digital camera. However, the present invention is by no means limited in this respect, and is also applicable to the attaching of lens adapters to various cameras such as, for example, video cameras and film cameras etc.

As described above, according to the present invention, it is possible to provide a lens adapter enabling the attaching of optical components such as a filter and a conversion lense etc. without providing dedicated members for use in attaching to the camera and that may be attached to and detached from a case in a straightforward manner.

The invention claimed is:

1. A lens adapter to be mounted on a collapsible lens-type camera with a lens barrel moving between a projection position projected to a front of a case and a housing position housed within the case, the lens adapter comprising:

an attachment section configured to be mounted on the case in a detachable manner the attachment section includes a first member and a second member swingably engaging each other in a detachable manner the first member having a first cylindrical wall formed in a semi-cylindrical shape, which forms a portion of the cylindrical wall section and the second member having a second cylindrical wall formed in a semi-cylindrical shape, which forms a remaining portion of the cylindrical wall section; and the cylindrical wall section is formed with the first cylindrical wall and the second cylindrical wall, and a lens barrel housing section provided at the attachment section and configured to house the lens barrel, the lens barrel housing section includes a cylindrical wall section covering the lens barrel and an opening provided at a front end of the cylindrical wall section so as to expose a front end of the lens barrel, the cylindrical wall section has an internal diameter and length such that the lens barrel positioned at the projection position is covered, a female screw configured to attach optical components is formed at the opening, the attachment section together with the lens barrel housing section are configured to partially expose the case when mounted on the case.

2. The lens adapter according to claim 1, wherein
the first member having a front wall that comes into contact with a portion of a front surface of the case nearer the lens barrel, and the second member having a rear wall that comes into contact with a rear surface of the case; the first member and the second member connect in a state that the case is sandwiched with the front wall and the rear wall in a direction from front to rear; and the lens barrel housing section is provided on the first member.

3. The lens adapter according to claim 2, wherein the first member and the second member have a side wall respectively which comes into contact with a side surface of the case.

4. The lens adapter according to claim 1, wherein the collapsible lens-type camera have a finder apparatus formed with an optic system separately from the lens barrel, the finder apparatus have an eyepiece window for viewing an image of a subject and is provided with opening and closing member for opening and closing the eyepiece window at a portion where the attachment section faces the eyepiece window.

5. The lens adapter according to claim 1, wherein the collapsible lens-type camera has a finder apparatus with a finder lens and is provided with opening and closing member for opening and closing the finder lens at a portion where the attachment section faces the finder lens.

6. The lens adapter according to claim 1, wherein both the attachment section and the lens barrel housing section are made from a synthetic resin having rigidity.

7. The lens adapter according to claim 1, wherein
both the attachment section and the lens barrel housing section are made from a synthetic resin having rigidity; a metallic ring is embedded and fixed at a front end of the cylindrical wall section; the opening is formed on an inside of an inner peripheral surface of the ring; and the female screw is formed on an inner peripheral surface of the ring.

8. The lens adapter according to claim 1, wherein the lens barrel housing section is formed of a material that blocks out light.

9. The lens adapter according to claim 1, wherein a female screw for tripod attachment is formed in the case, a screw insertion hole is formed at a portion of the attachment section facing the female screw for tripod attachment in a state that the attachment section is attached to the case, and the lens adapter is configured such that the attachment section is fixed on the case by screwing an attachment screw into the female screw for tripod attachment via the screw insertion hole.

10. The lens adapter according to claim 1, wherein a female screw for tripod attachment is provided at a portion that the attachment section faces a lower surface of the case.

11. The lens adapter according to claim 1, wherein various switches, in use for photographing are provided and the switches are located at the outer side of the attachment section and exposed outside in a state when the attachment section is attached on the case.

12. A lens adapter to be mounted on a collapsible lens-type camera with a lens barrel moving between a projection position projected to a front of a case and a housing position housed within the case, the lens adapter comprising:

an attachment section configured to be mounted on the case in a detachable manner the attachment section includes a first member and a second member swingably engaging each other in a detachable manner; and a lens barrel housing section provided at the attachment section and configured to house the lens barrel, the lens barrel housing section includes a cylindrical wall section covering the lens barrel and an opening provided at a front end of the cylindrical wall section so as to expose a front end of the lens barrel, the cylindrical wall section has an internal diameter and length such that the lens barrel positioned at the projection position is covered, a female screw configured to attach optical components is formed at the opening, the attachment section together with the lens barrel housing section are configured to partially expose the case when mounted on the case, the first member having a first cylindrical wall formed in a semi-cylindrical shape, which forms a portion of the cylindrical wall section and the second member having a second cylindrical wall formed in a semi-cylindrical shape, which forms a remaining portion of the cylindrical wall section; and the cylindrical wall section is formed with the first cylindrical wall and the second cylindrical wall, wherein the first member having a front wall coming into contact with a portion of a front surface nearer a lens barrel of the case and having a first cylindrical wall projecting from the front wall in a semi-cylindrical shape to form a portion of the cylindrical wall section and being provided with the opening and the second member having a front wall coming into contact with a portion other than a portion contacted by a front wall of the first member on a front surface nearer a lens barrel of the case and a second cylindrical wall projecting from the front wall in a semi-cylindrical shape to form a remaining portion of the cylindrical wall section; and the lens barrel housing section is formed with the first cylindrical wall and the second cylindrical wall.

13. The lens adapter according to claim 12, wherein the first member have a side wall coming into contact with a side surface of the case.

* * * * *